US012386920B2

(12) United States Patent
Sollami et al.

(10) Patent No.: US 12,386,920 B2
(45) Date of Patent: Aug. 12, 2025

(54) AUTOMATIC PRODUCT DESCRIPTION GENERATION

(71) Applicant: Salesforce, Inc., San Francisco, CA (US)

(72) Inventors: Michael Sollami, Cambridge, MA (US); Xiangyu Peng, Atlanta, GA (US)

(73) Assignee: Salesforce, Inc., San Francisco, CA (US)

( * ) Notice: Subject to any disclaimer, the term of this patent is extended or adjusted under 35 U.S.C. 154(b) by 956 days.

(21) Appl. No.: 17/509,024

(22) Filed: Oct. 24, 2021

(65) Prior Publication Data

US 2023/0128686 A1   Apr. 27, 2023

(51) Int. Cl.
| | |
|---|---|
| *G06N 3/04* | (2023.01) |
| *G06F 18/214* | (2023.01) |
| *G06F 18/22* | (2023.01) |
| *G06F 18/23* | (2023.01) |
| *G06N 3/045* | (2023.01) |
| *G06V 30/00* | (2022.01) |
| *G06V 30/262* | (2022.01) |

(52) U.S. Cl.
CPC ............ *G06F 18/22* (2023.01); *G06F 18/214* (2023.01); *G06F 18/23* (2023.01); *G06N 3/045* (2023.01); *G06V 30/262* (2022.01)

(58) Field of Classification Search
CPC .............................. G06N 3/045; G06V 30/262
See application file for complete search history.

(56) References Cited

U.S. PATENT DOCUMENTS

2020/0175053 A1* 6/2020 Zheng .................... G06N 5/046

OTHER PUBLICATIONS

Baig, Mirza Muhammad Ali, et al. "Image caption generator with novel object injection." 2018 Digital Image Computing: Techniques and Applications (DICTA). IEEE, 2018. (Year: 2018).*
Li, Jiangyun, et al. "Boosted transformer for image captioning." Applied Sciences 9.16 (2019): 3260. (Year: 2019).*
Yu et al., "Multimodal Transformer with Multi-View Visual Representation for Image Captioning", Journal of Latex Class Files, vol. 14, No. 8, Aug. 2015, (https://arxiv.org/abs/1905.07841).

(Continued)

*Primary Examiner* — Hal Schnee
(74) *Attorney, Agent, or Firm* — Butzel Long

(57) ABSTRACT

Systems, devices, and techniques are disclosed for automatic product description generation. A first set of features including labels including words may be generated from an image using a first feature extraction model. A second set of features including labels including words may be generated from the image using a second feature extraction model. A text description of a product depicted in the image may be generated by inputting the image and metadata for the image to a description generating model. The text description may include words. Each of the words may be generated by assigning probabilities to candidate words, boosting the assigned probabilities of candidate words that are similar to words of labels of the first set of features or words of labels of the second set of features, and selecting one of the candidate words based on the assigned probabilities after the boosting as a word of the text description.

17 Claims, 10 Drawing Sheets

(56) References Cited

OTHER PUBLICATIONS

Tsai et al., "Multimodal Transformer for Unaligned Multimodal Language Sequences", arXiv:1906.00295v1, Jun. 2019, (https://arxiv.org/abs/1906.00295).
Kaiser et al., "One Model to Learn Them All", arXiv:1706.05137v1, Jun. 2017, (https://arxiv.org/abs/1706.05137).
Chen et al., "UNITER: UNiversal Image-TExt Representation Learning", arXiv:1909.11740v3, Jul. 2020, (https://arxiv.org/abs/1909.11740).
Li et al., "VisualBERT: A Simple and Performant Baseline for Vision and Language", arXiv:1908.03557v1, Aug. 2019, (https://arxiv.org/abs/1908.03557).

* cited by examiner

AUTOMATIC PRODUCT DESCRIPTION GENERATION

BACKGROUND

Multi-modal models can be used to generate text descriptions of images. This may allow for automatic generation of product descriptions that may be used for selling products, such as clothes, on a website. However, multi-modal models may not generate accurate and relevant descriptions reliably enough for the automatically generated product descriptions to be used without first being reviewed by a person. Inaccuracy in product descriptions generated by a multi-modal model may be the result of several factors, including difficulty properly training multi-modal models, as automatic training may not be possible when the product descriptions need to be reviewed for accuracy by a person, lack of labeled training data for training multi-modal models, and multi-modal models' tendency to rely on word frequency.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
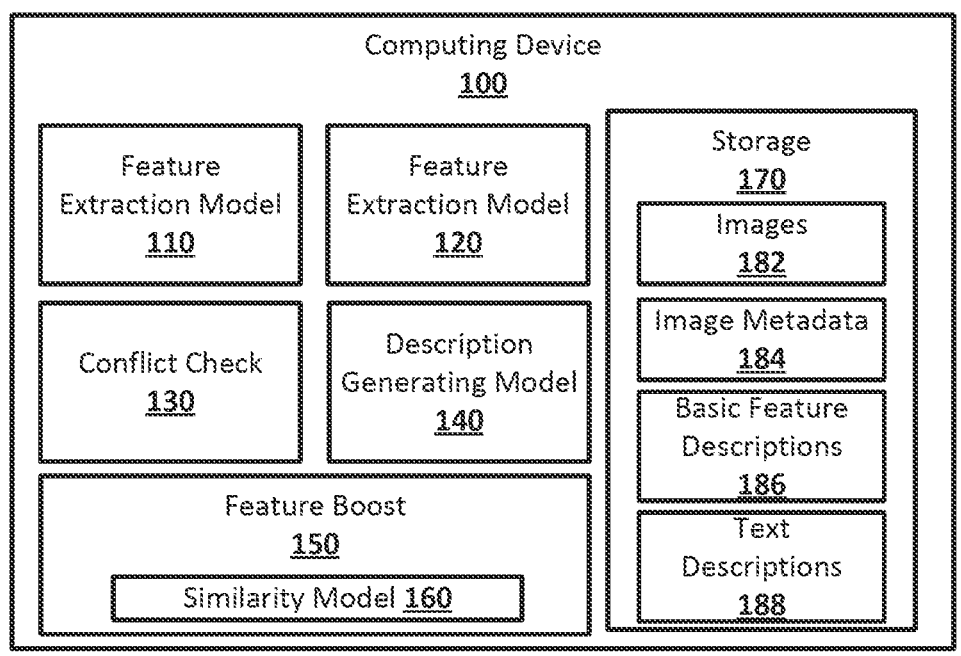
FIG. 1 shows an example system for suitable for automatic product description generation according to an implementation of the disclosed subject matter.

Techniques disclosed herein enable automatic product description generation, which may allow for a multi-modal model to be used to automatically generate text descriptions of products from images of the products with increased accuracy. A first set of features may be generated from an image using a first feature extraction model and a second set of features may be generated from the image using a second feature extraction model. A text description of the image may be generated by inputting the image and metadata for the image to a description generating model. The text description may include words, and each word in the text description may be generated by assigning probabilities to candidate words, boosting the assigned probabilities of candidate words that are similar to words of the first set of features or words of the second set of features, and selecting the candidate word with the highest assigned probability after the boosting as a word of the text description. A quality level of the text description may be determined based on user interactions with a website for a product depicted in the image that includes the text description of the image generated by inputting the image and metadata for the image to the description generating model. The description generating model may be adjusted based on the determined quality level of the text description.

A first set of features may be generated from an image using a first feature extraction model and a second set of features may be generated from the image using a second feature extraction model. A feature extraction model may be a machine learning model, such as, for example, a neural network, that may have been trained to generate sets of features from input images. The first feature extraction model may be a machine learning model trained using a public training data set, and the second feature extraction may be a machine learning model trained using a non-public training data set. Both the public and non-public training data sets may be training data sets for the same category of product, or item. For example, the public and non-public training data sets may be training data sets for clothing and may include images of clothing and labels of words that describe the clothing depicted in the image for each such image. The words may describe any suitable aspect of the image. For example, words describing clothing depicted in images may be words that describe the color, shape, style, material, and texture of the clothing or any component parts of the clothing. The words may be individual words or may be multiple words that form short descriptive phrases. For example, a green crew neck t-shirt may have labels of "green" and "crew neck." The public training data set may be a publicly available training data set. The non-public training data set may be a training data set that includes images and associated labels from a proprietary data source, for example, images of products from a retailer or manufacture product catalog and labels that have been created for the images of those products. The public and non-public training data sets may therefore be disjoint, as the labels for the images in the non-public training data set may not be available publicly even if the images themselves are.

The first feature extraction model and the second feature extraction model may use the same underlying machine learning model or may use different machine learning models. For example, both the first feature extraction model and the second feature extraction model may use their own copies of the same neural network architecture. Training of the first and second feature extraction models with the public and non-public training data sets may occur in any suitable manner.

An image may be input to both the first feature extraction model and the second feature extraction model. The image may be an image of a product, or item, that is in the category of products, or items, of the public and non-public training data sets. For example, if the public and non-public training data sets are training data sets for clothing, the image input to the first and second feature extraction models may be an image of clothing. The first feature extraction model may generate a first set of features based on the input image, and the second feature extraction model may generate a second set of features based on the input image. The first set of features and the second set of features may be sets of labels, which may include words from the training data sets. For example, the first set of features may be words from the public training data set that the first extraction model evaluates as having a high probability of describing the input image. The second set of features may be words form the non-public training data set that the second feature extraction model evaluates as having a high probability of describing the input image. Whether an individual word has a high probability of describing the input image may be determined in any suitable manner may by the first and second feature extraction models.

The first set of features and the second set of features may be conflict-checked and combined into an extracted feature set. For example, a basic feature description of the product in the image may be available. The basic feature description may by a non-narrative description that may include basic features of the product in the image. For example, if the product in the image is a shirt, the basic feature description may identify the shirt, a product group for the shirt, a length or size of the shirt, a basic style of the shirt, materials used in the shirt, and the color of the shirt. The basic feature description may serve as the ground truth about the product in the image. The first set of features and the second set of features may be conflict checked against the basic feature description. Any words from the labels of the first set of features or the second set of features that conflicts with or contradicts a basic feature of the product in the image according to the basic feature description may be removed from the first or second set of features. For example, if the first set of features includes the words "nylon", but the basic feature description states that the material of the product in the image is "cotton", and does not also mention "nylon", the word "nylon" may be removed from the first set of features. This may ensure that the first set of features and the second set of features do not contradict each other or any known ground truths about the product in the image from the basic feature description. The image may depict multiple products, for example, pants and a shirt, and the first and second set of features may include labels for both "pants" and "shirt", along with other labels relevant to the pants and the shirt. If the basic feature description describes the product as a "shirt", conflict checking the first and second set of features may remove any labels of, or related to, "pants", from the first and second set of features, as the pants may not be the product of interest in the image. Either before or after the conflict check, the first set of features and the second set of features may be combined into a single extracted feature set.

A text description of the image may be generated by inputting the image and metadata for the image to a description generating model. The description generating model may be any suitable trained machine learning model, including any suitable neural network using any suitable architecture, that may generate text descriptions using an image and metadata for an image, for example, text about the image, as input. The description generating model may be, for example, a multi-modal model that may have been trained using images of products and product descriptions. The metadata for the image may be, for example, the name and brand or manufacturer of the product in the image being input to the description generating model. A training data set used to train the description generating model may include images and product descriptions from various brands or manufacturers, and including the brand or manufacturer in the input to the description generating model may allow the model to generate text descriptions that are more appropriate to a style of writing used in the brand or manufacturers product descriptions, as represented in the training data set for the description generating model.

The text description may include words, and each word in the text description may be generated by assigning probabilities to candidate words, boosting the assigned probabilities of candidate words that are similar to words of the labels in the extracted feature set, and selecting the candidate word with the highest assigned probability after the boosting as a word of the text description. The description generating model may generate text descriptions for the input image and metadata word-by-word. When selecting the next word for the text description, the description generating model may assign probabilities to words in a corpus of words available to the description generating model. These may be the candidate words and may include all words in the corpus of words or may be limited to a subset of the words in the corpus of words. The candidate word assigned the highest probability may be selected as the next word of the text description and may be added to the text description. The description generating model may then repeat the process in order to generate the next word for the text description based on the image, metadata for the image, and the already selected words of the text description. This may be repeated until the description generating model has reached a stopping point, for example, generating an end-of-sequence symbol as the next word.

The extracted feature set, as the combination of the first set of features and the second set of features, may be used to boost the probabilities assigned to candidate words by the description generating model when the description generating model is generating the next word for the text description. Candidate words to which the description generating model has assigned probabilities that are similar to words from labels of the extracted feature set may have their probabilities boosted. The assigned probabilities may be boosted in any suitable manner, and by any suitable amount. For example, the probability assigned to a candidate word that is similar to a word from extracted feature set may be increased by a specified percentage, or by a specified number of percentage points. For example, one of the candidate words may be "denim" and the extracted feature set may include the word "cotton". This may result in the probability assigned to "denim" being boosted, for example, from 80% to 90%. Boosting the probabilities assigned by the description generating model to words from the corpus of words when they are similar to words from the extracted feature set may increase the probability that the word selected to be the next word in the text description describes the product in the image that was input to the description generating model and to the first and second feature extraction models.

In some implementations, the probabilities assigned to candidate words that are dissimilar to words from the extracted feature set may be decreased. For example, the candidate word "polyester" may be dissimilar from all words in the extracted feature set, and may have its probability decreased, for example, from 75% to 60%. This may decrease the probability that a word selected to be the next word in the text description is a word that does not accurately describe the product in the image that was input to the description generating model and to the first and second feature extraction models.

In some implementations, the extracted feature set may be subjected to top-k restrictions before being used to boost the assigned probabilities of candidate words. The top-k restrictions may restrict the words from the extracted feature set used to determine which candidate words should have their probabilities boosted to the k words with the highest probabilities assigned to them by either the first or second feature extraction model. When generating the first and second sets of features, the first and second feature extraction models may assign a probability to each generated word that indicates the model's confidence that the word describes a feature of the product in the image input to the first and second feature extraction models. Applying top-k restrictions to the extracted feature set may limit the words from the extracted feature set compared to the candidate words to k words, where k may be any suitable number. For example, k may be 20, which may result in the 20 words from the extracted feature set that have the highest assigned probabilities being compared to the candidate words. Candidate words that are similar to any of these 20 words may have their assigned probabilities boosted, while candidate words similar to words from the extracted feature set that are not part of these 20 words may not have their probabilities boosted, as no similarity comparison may be performed with those words not part of the top 20 words.

Boosting the assigned probabilities of candidate words that are similar to words of the extracted feature set may be done by determining levels of similarity between the candidate words and the words of the extracted feature set using a similarity model. The similarity model may be any suitable model for evaluating how similar, or dissimilar, two words are. The similarity model may, for example, perform lookups using any suitable thesaurus to determine similarity between two words based on whether the thesaurus lists one of the words as a synonym or antonym for the other, or doesn't show any relation between the words. The similarity model may also be any suitable machine learning model trained on any suitable data set, including a data set drawn from, for example, multiple thesauruses. The similarity model may also use categories and subcategories to determine whether words are similar.

A quality level of the text description may be determined based on metrics for user interactions with a website for a product depicted in the image that includes the text description of the image generated by inputting the image and metadata for the image to the description generating model. The description generating model may be adjusted based on the determined quality level of the text description. The text description generated by the description generating model from an input image may be placed on a webpage of a website that may sell the product depicted in the image, for example, a webpage of a ecommerce website that may be used to purchase the product. Any suitable metrics for any user interactions with the website may be monitored and collected and used to evaluate the quality level of the text description. For example, the number of users who visit the webpage for the product, the percentage of those users that add the product to an online shopping cart, and the percentage of those users that purchase the product may be monitored. Higher percentages of users who add the product to their online shopping cart, and higher percentages of users who purchase the product, may indicate a higher quality level of the text description, while lower percentages may indicate a lower quality level of the text descriptions. A reward model may be used to adjust the description generating model based on the determined quality level for the text description. A text description that is determined to be of low quality may result in adjustments being made to the description generating model based on the reward model. For example, the description generating model may be a neural network, and the weights of the neural network may be adjusted based on the reward model when a text description is determined to be of low quality.

Boosting the probabilities assigned to candidate words by the description generating model based on the words' similarity to words in the extracted feature set may decrease instances of the text description generated based on image including inaccurate statements about the product in the image. For example, if the image is for the product of a t-shirt, but includes a person wearing both the t-shirt and a pair of jeans, the use of boosting based on the words in the extracted feature set, conflict checked against the basic product description, may boost probabilities for candidate words related to t-shirts, and may not boost, or may decrease, probabilities for candidate words related to jeans. This may increase the probability that the words selected for the text description from the candidate words will describe the product as a t-shirt and will not describe the product as jeans. The boosted probabilities may also result in higher quality text descriptions. For example, a text description generated by a description generating model for a sweatshirt dress without boosting probabilities of candidate words may be "The Loop Back Sweater Dress by High Neck is a chic and comfortable sweater dress with a loop back design. The sweater dress has a wide round neckline and a high-low cut back.", while text description generated for the same sweatshirt dress using the same description generating model with boosting probabilities may be "The Loop Back Sweater Dress by High Neck is a chic and comfortable sweater dress with a loop back design. The sweater dress has a high neck with a high back and a loop back design." The second description may more accurately describe the sweatshirt dress.

FIG. 1 shows an example system for suitable for automatic product description generation according to an implementation of the disclosed subject matter. A computing device 100 may be any suitable computing device, such as, for example, a computer 20 as described in FIG. 7, or component thereof, for implementing automatic product description generation. The computing device 100 may include a feature extraction model 110, a feature extraction model 120, a conflict check 130, a description generating model 140, a feature boost 150, a similarity model 160, and a storage 170. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The feature extraction model 110 may be any suitable combination of hardware and software of the computing device 100 for generating a set of features from an input image. The feature extraction model 110 may, for example, be any suitable machine learning model trained using a public training data set. The public training data set may be training data sets for a particular category of product. For example, the public training data set may be a training data set for clothing and may include images of clothing and for each such image, labels including words that describe the clothing depicted in the image. The words may describe any suitable aspect of the image. For example, words describing clothing depicted in images may be words that describe the color, shape, style, material, and texture of the clothing or any component parts of the clothing. The public training data set may be a publicly available training data set. The feature extraction model 110 may have been trained using the public training data set in any suitable manner. The feature extraction model 110 may use any suitable underlying machine learning model and architecture. For example, the feature extraction model 110 may use any suitable neural network architecture.

The feature extraction model 110 may accept as input an image, for example, an image of a product from the category of product of the public training data set. The feature extraction model 110 may output, for an input image, a set of features. The set of features may be labels, in the form of words, each of which may be assigned a probability by the feature extraction model 110 indicating the probability, or confidence level of the feature extraction model 110, that the word describes the product in the image. Each label may be an individual word, or multiple words in short descriptive phrases. The words in the set of features generated by the feature extraction model 110 may be words that are found in the labels of the public training data set, as this may be the corpus of words available to the feature extraction model 110. For example, if the feature extraction model 110 was trained with a public training data set for clothing, the words in the labels output by the feature extraction model 110 may be words that describe clothing, as found in the public training data set. The set of features output by the feature extraction model 110 may only include labels that have been assigned a probability above a certain threshold. For example, the set of features generated by the feature extraction model 110 may only include labels to which the feature extraction model 110 assigned an 85% or higher probability.

The feature extraction model 120 may be any suitable combination of hardware and software of the computing device 100 for generating a set of features from an input image. The feature extraction model 120 may, for example, be any suitable machine learning model trained using a non-public training data set. The non-public training data set may be a training data set for the same particular category of product as the public training data set. For example, if the public training data set is a training data set for clothing, the non-public training data set may also be a training data set for clothing, and may include images of clothing and for each such image, labels including of words that describe the clothing depicted in the image. This may ensure that the feature extraction model 110 and the feature extraction model 120 are trained on data for the same category of product. The non-public training data set may be a training data set that includes images and associated labels from a proprietary data source, for example, images of products from a retailer or manufacturer product catalog and labels that have been created for the images of those products. The public and non-public training data sets may be disjoint, as the labels for the images in the non-public training data set may not be available publicly even if the images themselves are. The feature extraction model 120 may have been trained using the non-public training data set in any suitable manner. The feature extraction model 120 may use any suitable underlying machine learning model, which may be the same as or different from the underlying machine learning model and/or architecture of the feature extraction model 110. For example, the feature extraction model 120 may use any suitable neural network architecture, including a neural network architecture that is the same as a neural network architecture used by the feature extraction model 110.

The feature extraction model 120 may accept as input an image, for example, an image of a product from the category of product of the public training data set. The feature extraction model 120 may output, for an input image, a set of features. The set of features may be labels, in the form of words, each of which may be assigned a probability by the feature extraction model 120 indicating the probability, or confidence level of the feature extraction model 120, that the word describes the product in the image. Each label may be an individual word, or multiple words in short descriptive phrases. The words in the set of features generated by the feature extraction model 120 may be words that are found in the labels of the non-public training data set, as this may be the corpus of words available to the feature extraction model 120. For example, if the feature extraction model 120 was trained with a public training data set for clothing, the words in the labels output by the feature extraction model 120 may be words that describe clothing, as found in the non-public training data set. The set of features output by the feature extraction model 120 may only include labels that have been assigned a probability above a certain threshold. For example, the set of features generated by the feature extraction model 120 may only include labels to which the feature extraction model 120 assigned an 85% or higher probability.

The conflict check 130 may be any suitable combination of hardware and software of the computing device 100 for performing conflict checking. The conflict check 130 may, for example, conflict check the sets of features generated by the feature extraction models 110 and 120 based on an input image against a basic feature description of the product in the image. The basic feature description of the product in the image may include basic features of the product in the image. For example, the basic feature description for an image of a clothing product may include a product group, color, style, size, and material composition of the clothing product. The conflict check 130 may determine whether any of the labels in the sets of features output by the feature extraction models 110 and 120 conflict with any data in the basic feature description. A label may conflict with data from a basic feature description when the label is contradicted by the data in the basic feature description. For example, if one of the sets of features extracted from an image of a product includes a label of "jeans", and the basic product description for the product in the image includes data indicating the product is a "t-shirt", the conflict check 130 may determine that the label "jeans" conflicts with the basic product description, and may remove the label "jeans" from the set of features. Similarly, if the sets of features for a product in an image include a label for a material, for example, "nylon", that is not listed in the material composition included in the basic feature description for the product, the conflicting label of "nylon" may be removed from the sets of features. In this manner, the conflict check 130 may ensure that all of the labels in the sets of features output by the feature extraction models 110 and 120 based on an input image of a product are consistent with known features of the product based on the basic feature description for the product. This may ensure, for example, that the sets of features describe the appropriate product in an image that has more than one potential product. The sets of features from the feature extraction models 110 and 120 may be combined into a single extracted feature set, for example, by the conflict check 130, either before or after the conflict check 130 performs conflict checking.

The description generating model 140 may be any suitable combination of hardware and software of the computing device 100 for generating text descriptions based on an input image and metadata for the image. The description generating model 140 may be any suitable trained machine learning model, including any suitable neural network using any suitable architecture, that may generate text descriptions using an image and metadata for an image, for example, text about the image, as input. The description generating model 140 may be, for example, a multi-modal model that may have been trained using images of products and textual product descriptions. The metadata for the image may be, for example, the name and brand or manufacturer of the product in the image being input to the description generating model. A training data set used to train the description generating model 140 may include images and product descriptions from various brands or manufacturers, and including the brand or manufacturer in the input to the description generating model may allow the description generating model 140 to generate text descriptions that are more appropriate to a style of writing used in the brand or manufacturers product descriptions, as represented in the training data set for the description generating model 140. The description generating model 140 may have been trained in any suitable manner.

A text description generated by the description generating model 140 may include words. The description generating model 140 may generate each word in the text description by assigning probabilities to candidate words, which may be, for example, all words in a corpus available to the description generating model 140. The assigned probabilities of candidate words that are similar to words of labels of the extracted feature set may be boosted and the candidate word with the highest assigned probability after the boosting may be selected as a word of the text description, for example, by a decoder component of the description generating model 140. The description generating model 140 may generate text descriptions for the input image and metadata word-by-word. After selecting a word to be the next word in the text description, the description generating model 140 may then repeat the process in order to generate the next word for the text description based on the image, metadata for the image, and words already selected for the text description. This may be repeated until the description generating model 140 has reached a stopping point, for example, generating an end-of-sequence symbol as the next word.

The feature boost 150 may be any suitable combination of hardware and software of the computing device 100 for determining adjusting the assigned probabilities of candidate words. The feature boost 150 may use the extracted feature set to boost the probabilities assigned to candidate words by the description generating model 140. Candidate words to which the description generating model 140 has assigned probabilities that are similar to words of labels from the extracted feature set, for example, as determined using the similarity model 160, may have their probabilities boosted. The feature boost 150 may boost assigned probabilities in any suitable manner, and by any suitable amount. For example, the feature boost 150 may increase a probability assigned to a candidate word that is similar to a word from the extracted feature set by a specified percentage, or by a specified number of percentage points. For example, one of the candidate words may be "denim" and the extracted feature set may include the word "cotton". This may result in the probability assigned to "denim" being boosted, for example, from 80% to 95%, as denim may be a form of cotton. In some implementations, the feature boost 150 may also decrease the probabilities assigned to candidate words that are dissimilar to words from the extracted feature set. For example, the candidate word "polyester" may be dissimilar from all words in the extracted feature set, and the feature boost 150 may decrease the assigned probability for "polyester", for example, from 75% to 60%.

The similarity model 160 may be any suitable combination of hardware and software of the computing device 100 for determining the similarity between words. The similarity model 160 may be any suitable model for evaluating how similar, or dissimilar, words are. The similarity model 160 may, for example, perform lookups using any suitable thesaurus to determine similarity between words based on whether the thesaurus lists one of the words as a synonym or antonym for the other, or doesn't show any relation between the words. The similarity model 160 may also determine similarity based on word categorization, for example, considering words to be similar when one word is subcategory or type of another word. For example, the word "shirt" may be similar to "clothing", of which it is a subcategory, as well as "t-shirt" and "dress shirt", which are types of the category of "shirt." The similarity model 160 may also be any suitable machine learning model trained on any suitable data set, including a data set drawn from, for example, multiple thesauruses as well as any categorization system. The similarity model 160 may be, for example, a component of the feature boost 150.

The storage 170 may be any suitable combination of hardware and software for storing data. The storage 170 may include any suitable combination of volatile and non-volatile storage hardware, and may include components of the computing device 100 and hardware accessible to the computing device 100, for example, through wired and wireless direct or network connections. The storage 170 may store images 182, image metadata 184, basic feature descriptions 186, and text descriptions 188. The images 182 may be images of products, for example, images from a product catalog including products offered for sale on a website. The image metadata 184 may be metadata for images from the images 182, including, for example, the name and brand or manufacturer of the products in the images. Each image in the images 182 may have associated metadata in the image metadata 184. The basic feature descriptions 186 may be basic feature descriptions for products in the images from the images 182, and may be a non-narrative descriptions that may include basic features of the products in the images. The text descriptions 188 may be text descriptions for products in images from the images 182 that may be narrative text descriptions generated by the description generating model 140.

Figure 2:
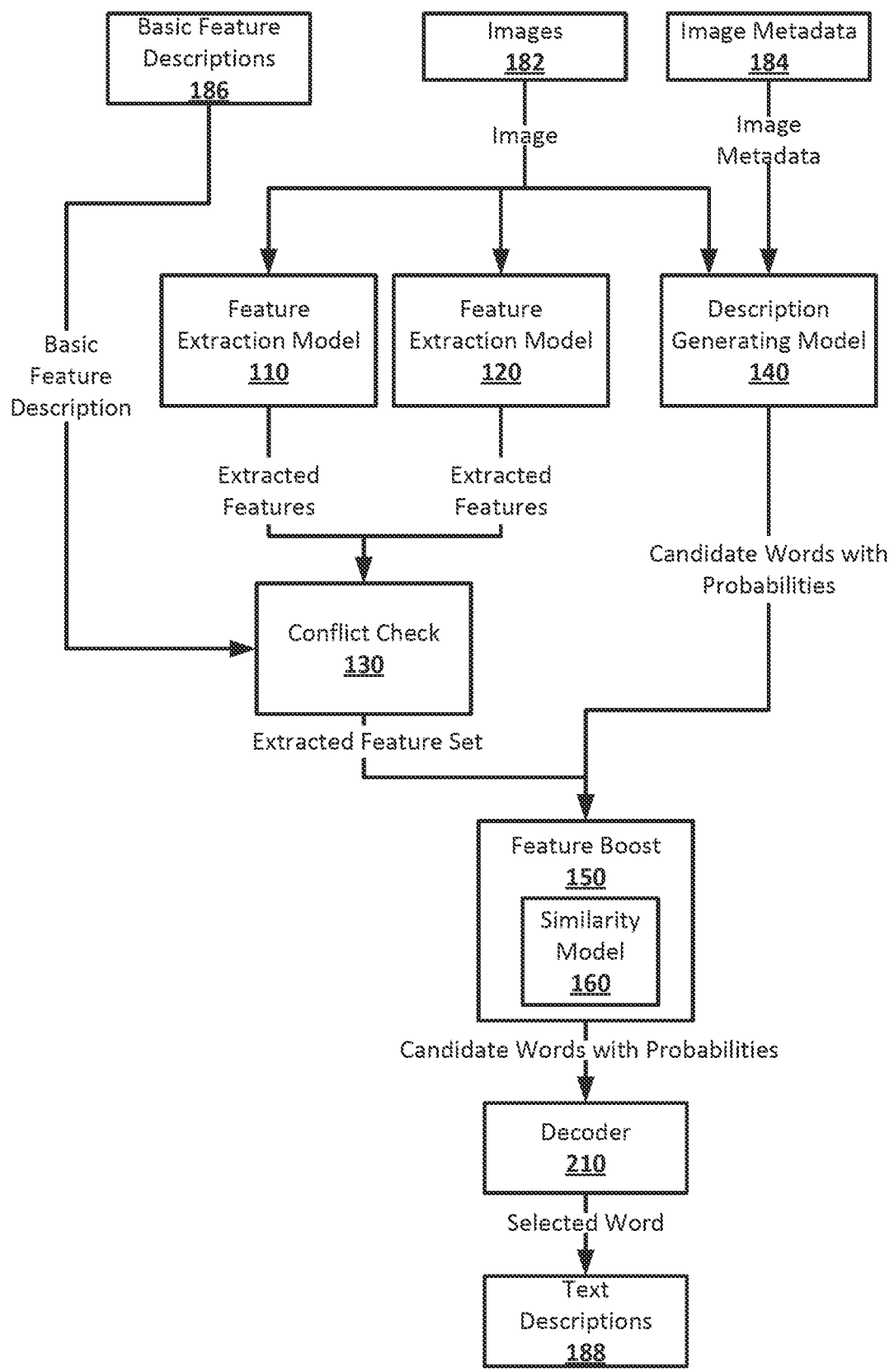
FIG. 2 shows an example arrangement suitable for automatic product description generation according to an implementation of the disclosed subject matter.

FIG. 2 shows an example arrangement for suitable for automatic product description generation according to an implementation of the disclosed subject matter. An image from the images 182 may be received by the feature extraction model 110, the feature extraction model 120, and the description generating model 140, which may all receive the same image. The description generating model 140 may also receive the associated metadata from the image metadata 184 for the image from the images 182.

The feature extraction model 110 and the feature extraction model 120 may each generate a set of features from the image. The image may be an image of a product, and both the feature extraction model 110 and the feature extraction model 120 may have been trained on training data sets with other images of products of the same type as the product in the image. For example, the image may be of a clothing product, and the feature extraction models 110 and 120 may have been trained using training data sets with images of clothing products. The sets of features may be in any suitable format, such as, for example, vector or array format, and may include any suitable data, including, for example, the labels for the features identified in the image by the feature extraction model 110 and the feature extraction model 120, and probabilities or confidence levels assigned to the labels. The labels may be, for example, words or short phrases, and may related to a product of the type in the image from the images 182. The set of features generated by the feature extraction model 110 may include labels with words from the public training data set used to train the feature extraction model 110. The set of features generated by the feature extraction model 120 may include labels with words from the non-public training data set used to train the feature extraction model 120.

The conflict check 130 may receive the sets of features from the feature extraction model 110 and the feature extraction model 120 and the basic feature description from the basic feature descriptions 186 for the product in the image from the images 182. The basic feature description for the image may be considered to be the ground truth for the product in the image. The conflict check 130 may determine whether any of the labels in the sets of features conflict with data in the basic feature description. Any labels determined to conflict with data from the basic feature description may be removed from the sets of features. For example, the basic feature description for a shirt may include data on the material composition of the shirt. If either of the sets of features includes a label for a material that is not one of the materials included in the basic feature description for the shirt, that label may be removed from its set of features for conflicting with the basic feature description. This may ensure that, after the conflict check 130 has finished, none of the labels in the sets of features conflict with or are contradictory to ground truths about the product in the image as included in the data of the basic feature description. The conflict check 130 may generate an extracted feature set, which may include labels from both sets of features receive by the conflict check 130 that the conflict check 130 did not remove for conflicting with or being contradictory to data in the basic feature description received by the conflict check 130.

The description generating model 140 may generate a text description from the image and the image metadata. The text description may be a narrative textual description of the product in the image. The description generating model 140 may generate the text description one word at a time. For each word, the description generating model 140 may generate a list of candidate words and may assign the candidate words probabilities. The candidate words with assigned probabilities may be generated in any suitable format, such as a vector or an array. The candidate words may, for example, be all words in the corpus of words available to the description generating model 140 based on the training data set used to train the description generating model 140, or may be a subset of the corpus of words. The probability assigned to a candidate word may be the probability that the candidate word will be the next word in the text description. The description generating model 140 may also, after at least one word has already been generated for the text description, use previously generated words when assigning probabilities to candidate words for the next word of the text description so that candidate words that better follow from previously generated words are assigned higher probabilities.

The feature boost 150 may receive the extracted feature set from the conflict check 130 and the candidate words with probabilities from the description generating model 140. The feature boost 150 may determine which, if any, of the candidate words are similar to words of the labels from the extracted feature set, and may boost the probabilities assigned to those words. Whether any words are similar may be determined by, for example, the similarity model 160, which may be used to compare each of the candidate words to all of the words of the labels of the extracted feature set. Words may be similar, for example, when they are the same or synonyms. In some implementations, only the top-K, for example, top 20, labels from the extracted feature set may be used for comparison. The boost given to the probability of a candidate word that is similar to words from a label of the extracted feature set by the feature boost 150 may be any suitable amount, including any suitable percentage or number of percentage points. In some implementations, the similarity model 160 may also determine if words are dissimilar, for example antonyms, and the probabilities for candidate words thar are dissimilar to words from the labels of the extracted feature set may be reduced. The feature boost 150 may output the candidate words with probabilities in any suitable format, including the format in which they were received, with any suitable changes having been made to the assigned probabilities.

A decoder 210 may receive the candidate words with probabilities from the feature boost 150. The decoder 210 may be a component of the description generating model 140. The decoder 210 select a word from among the candidate words as the next word in the text description. The decoder 210 may select the next word from among the candidate words in any suitable manner. For example, the decoder 210 may, in all instances, select the candidate word that has the highest probability assigned to it, based on the probabilities assigned by the description generating model 140 and changed by the feature boost 150. If more than one candidate word has the high probability, the decoder 210 may select from among any such candidate words in any suitable manner. The candidate word, once selected, may be added to the text description for the product in the image that was input to the description generation model 140. The text description may be stored in the text descriptions 188. Once the selected word has been added to the text description, the text description may be input to the description generating model 140, which may generate probabilities for the candidate words again. These candidate words may be input back into the feature boost 150, which may use the same extracted feature set to change the probabilities before sending the candidate words and probabilities back to the decoder 210, which may select the next word in the text description. This may continue until the word selected by the decoder 210 is a end-of-sequence symbol for the description generating model 140, indicating the text description has been completed.

Figure 3A:
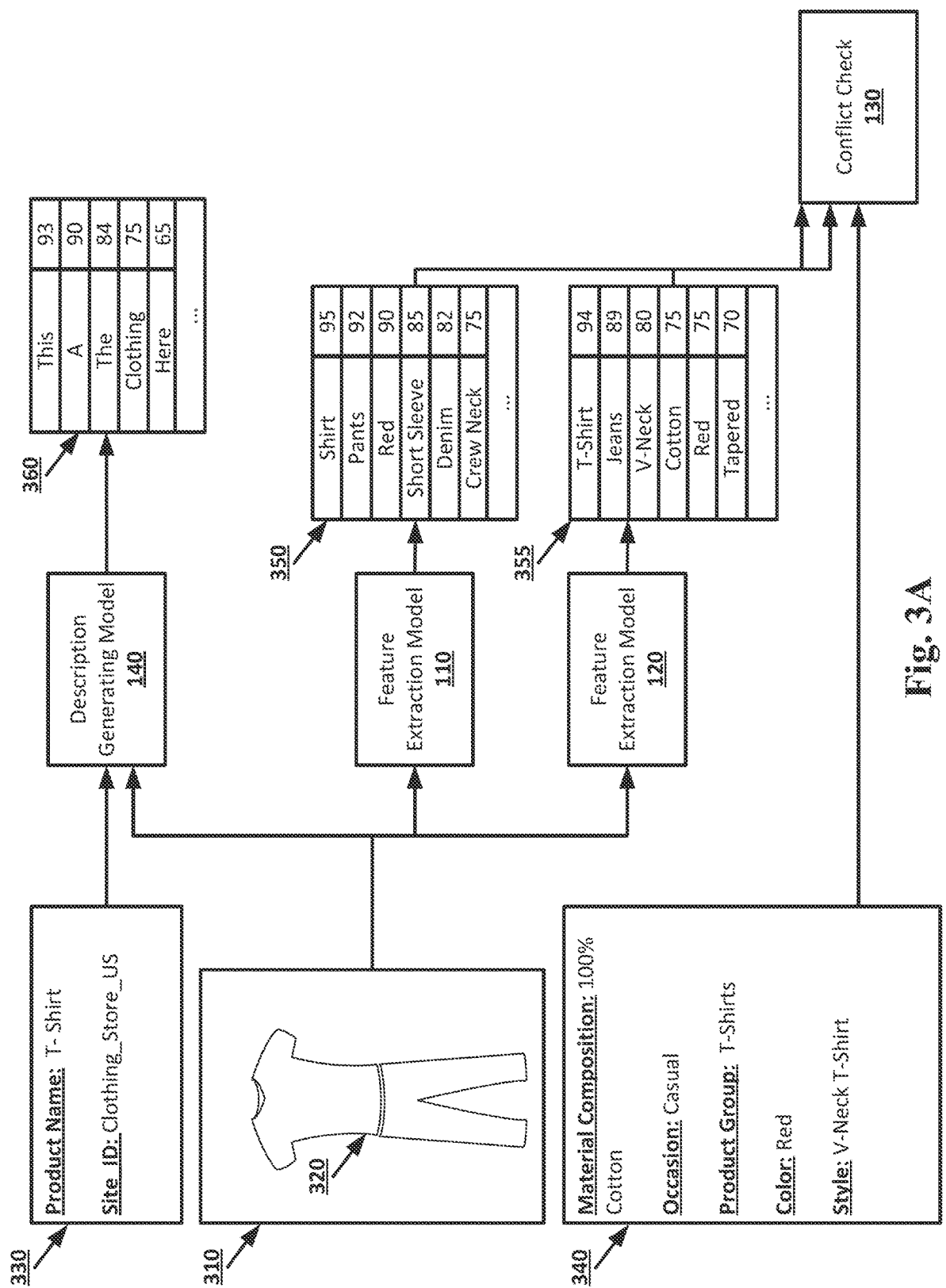
FIG. 3A shows an example arrangement suitable for automatic product description generation according to an implementation of the disclosed subject matter.

FIG. 3A shows an example arrangement for suitable for automatic product description generation according to an implementation of the disclosed subject matter. An image 310 from the images 182 may be input to the feature extraction model 110, the feature extraction model 120, and the description generating model 140. The image 310 may be include a product of a shirt 320. Image metadata 330 for the image 310 from the image metadata 184 may include metadata about the shirt 320, and may be input to the description generating model 140. Basic feature description 340 for the shirt 320 from the basic feature descriptions 186 may be input to the conflict check 130. The feature extraction model 110 and feature extraction model 120 may output sets of features 350 and 355, including labels for features extracted from the image 310, to the conflict check 130. The set of features 350 and 355 may include labels and probabilities the labels describe a feature of the image 310. The description generating model 140 may generate candidate words with probabilities 360, which may be candidate words with assigned probabilities that the candidate words should be the first word of the text description of the shirt 320 from the image 310.

Figure 3B:
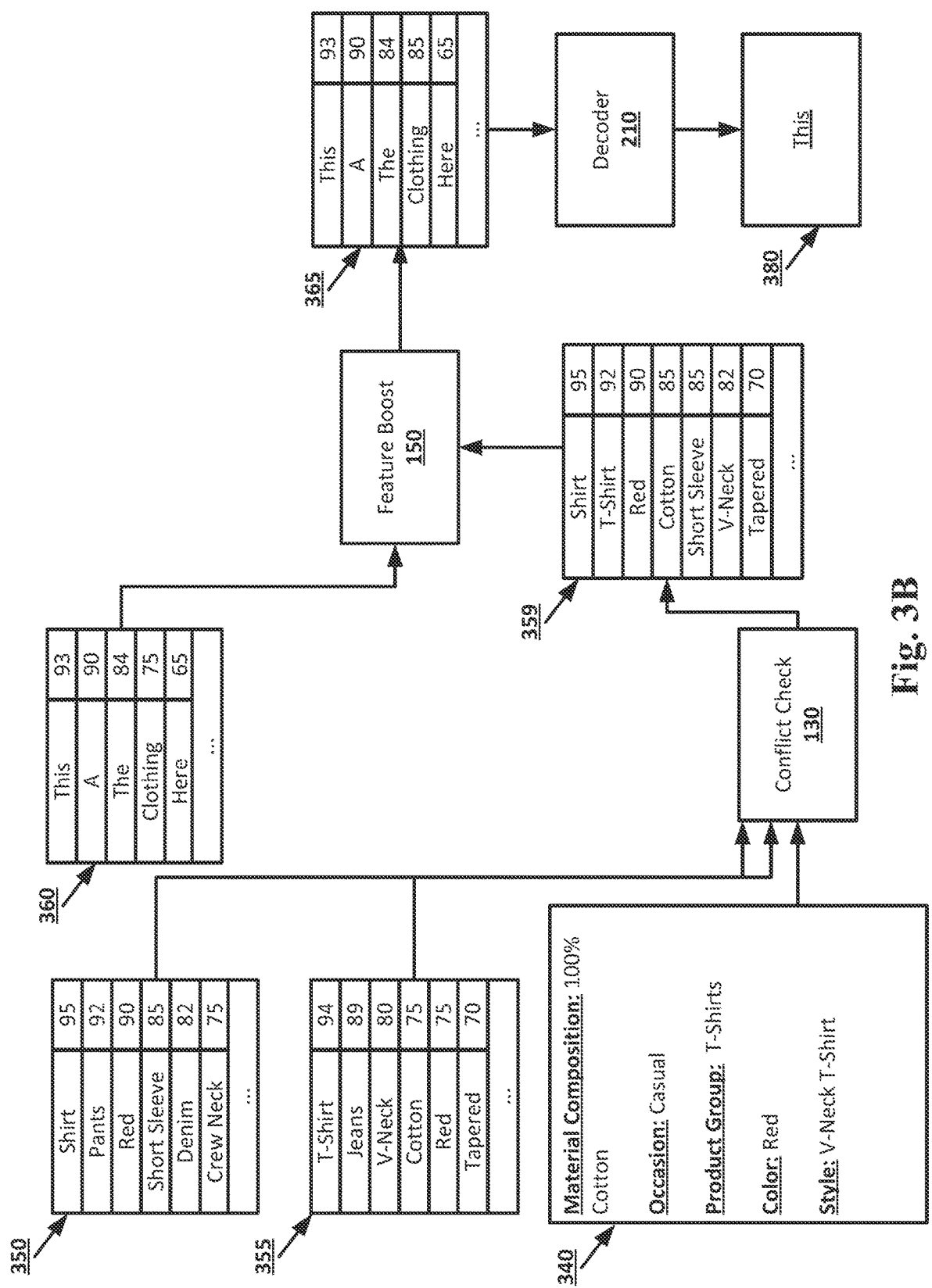
FIG. 3B shows an example arrangement suitable for automatic product description generation according to an implementation of the disclosed subject matter.

FIG. 3B shows an example arrangement for suitable for automatic product description generation according to an implementation of the disclosed subject matter. The conflict check 130 may check for conflicts between the data in the basic feature description 340 and the labels in the sets of features 350 and 355 and may remove any conflicting labels. For example, the basic feature description 340 may indicate that the product in the image 310 is a shirt, which may result in the conflict check 130 removing the label "jeans" from the sets of features 350 and 355. Similarly, the conflict check 130 may remove the label "denim" for conflicting with the basic feature description 340 indicating that the material of the product in the image 310, the shirt 320, is 100% cotton, and may remove the label "crew neck" for conflicting with the basic feature description 340 indicating that the product in the image 310 is a "V-Neck." The remaining labels from the sets of features 350 and 355 may be combined into the extracted feature set 359.

The extracted feature set 359 and the candidate words and probabilities 360 may be input to the feature boost 150. The feature boost 150 may use the received extracted feature set 359 to determine which candidate words from the candidate words and probabilities 360 should have their probabilities boosted, for example, based on the similarity between the candidate words and words from the labels of the extracted feature set 359 as determined by the similarity model 160. For example, the feature boost 150 may determine that the candidate word "clothing" is similar to words from labels in the extracted feature set 359, for example, "shirt" and "t-shirt", and may boost the probability that was assigned to the word clothing. The feature boost 150 may also decrease the probabilities assigned to candidate words that are dissimilar to words from labels of the extracted feature set 359. The feature boost 150 may output the candidate words and probabilities 365, which may be the candidate words and probabilities 360 with some probabilities changed by the feature boost 150.

The candidate words and probabilities 365 may be input to the decoder 210. The decoder 210 may use the received candidate words and probabilities 365 to select the next word for a text description 380 of the product in the image 310, the shirt 320. The decoder 210 may, for example, select the candidate word with the highest probability, which may be "this." The decoder 210 may add the word "this" to the text description 380.

Figure 3C:
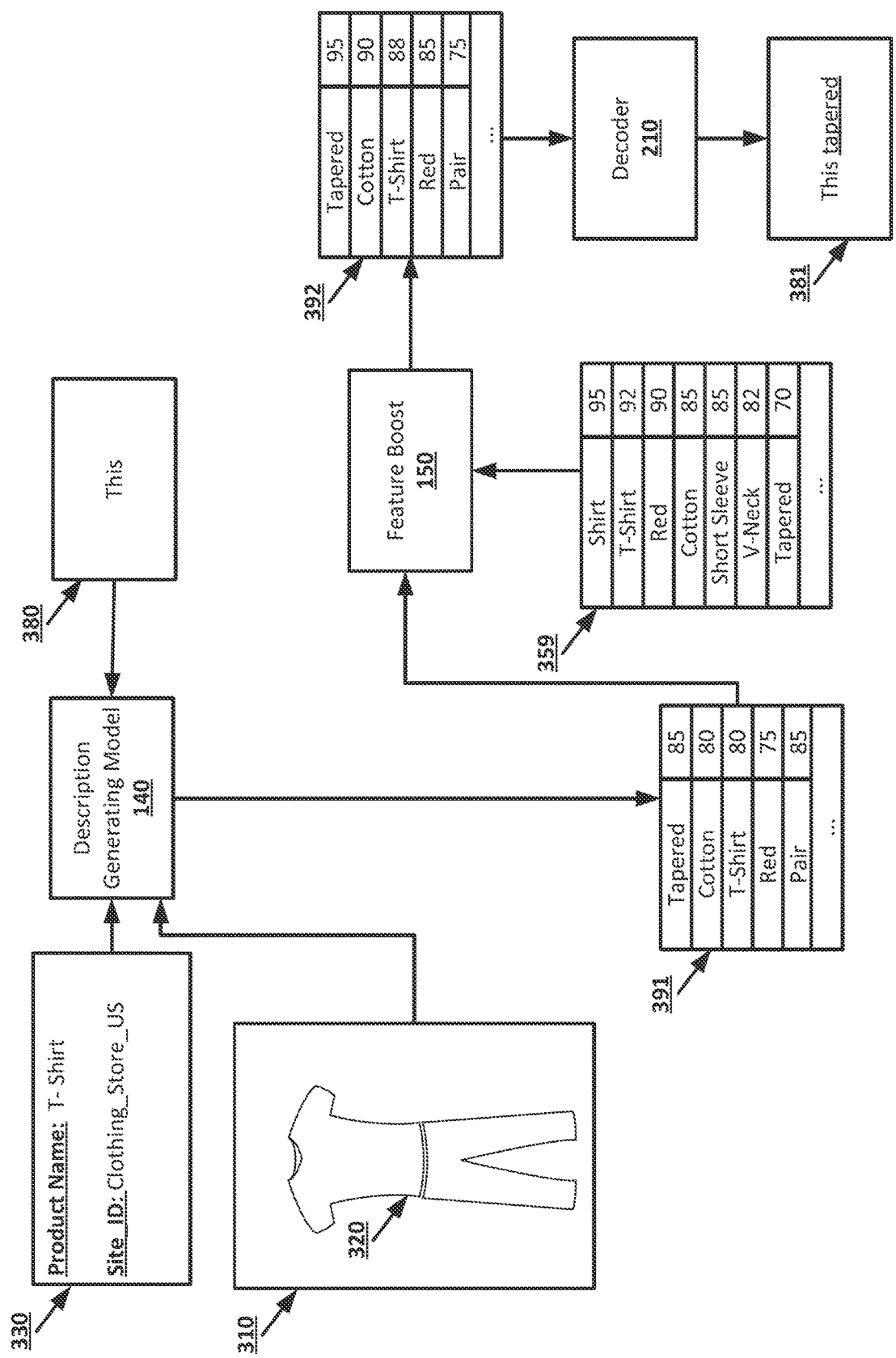
FIG. 3C shows an example arrangement suitable for automatic product description generation according to an implementation of the disclosed subject matter.

FIG. 3C shows an example arrangement for suitable for automatic product description generation according to an implementation of the disclosed subject matter. The text description 380, including the first word generated by the description generating model 140, may be input to the description generating model 140 along with the image metadata 330 and the image 310. The description generating model 140 may generate candidate words with probabilities 391, which may be candidate words with assigned probabilities that the candidate words should be the next word of the text description of the shirt 320 from the image 310.

The extracted feature set 359 and the candidate words and probabilities 391 may be input to the feature boost 150. The feature boost 150 may use the received extracted feature set 359 to determine which candidate words from the candidate words and probabilities 391 should have their probabilities boosted, for example, based on the similarity between the candidate words and words from the labels of the extracted feature set 359 as determined by the similarity model 160. For example, the feature boost 150 may determine that the candidate word "tapered" is similar to words from labels in the extracted feature set 359, for example, "tapered", and may boost the probability that was assigned to the word "tapered". The feature boost 150 may also decrease the probabilities assigned to candidate words that are dissimilar to words from labels of the extracted feature set 359. The feature boost 150 may output the candidate words and probabilities 392, which may be the candidate words and probabilities 360 with some probabilities changed by the feature boost 150.

The candidate words and probabilities 392 may be input to the decoder 210. The decoder 210 may use the received candidate words and probabilities 392 to select the next word for a text description 381 of the product in the image 310, the shirt 320. The text description 381 may be the text description 380 with the newly selected word added. The decoder 210 may, for example, select the candidate word with the highest probability, which may be "tapered." The decoder 210 may add the word "tapered" to the text description 381.

Figure 3D:
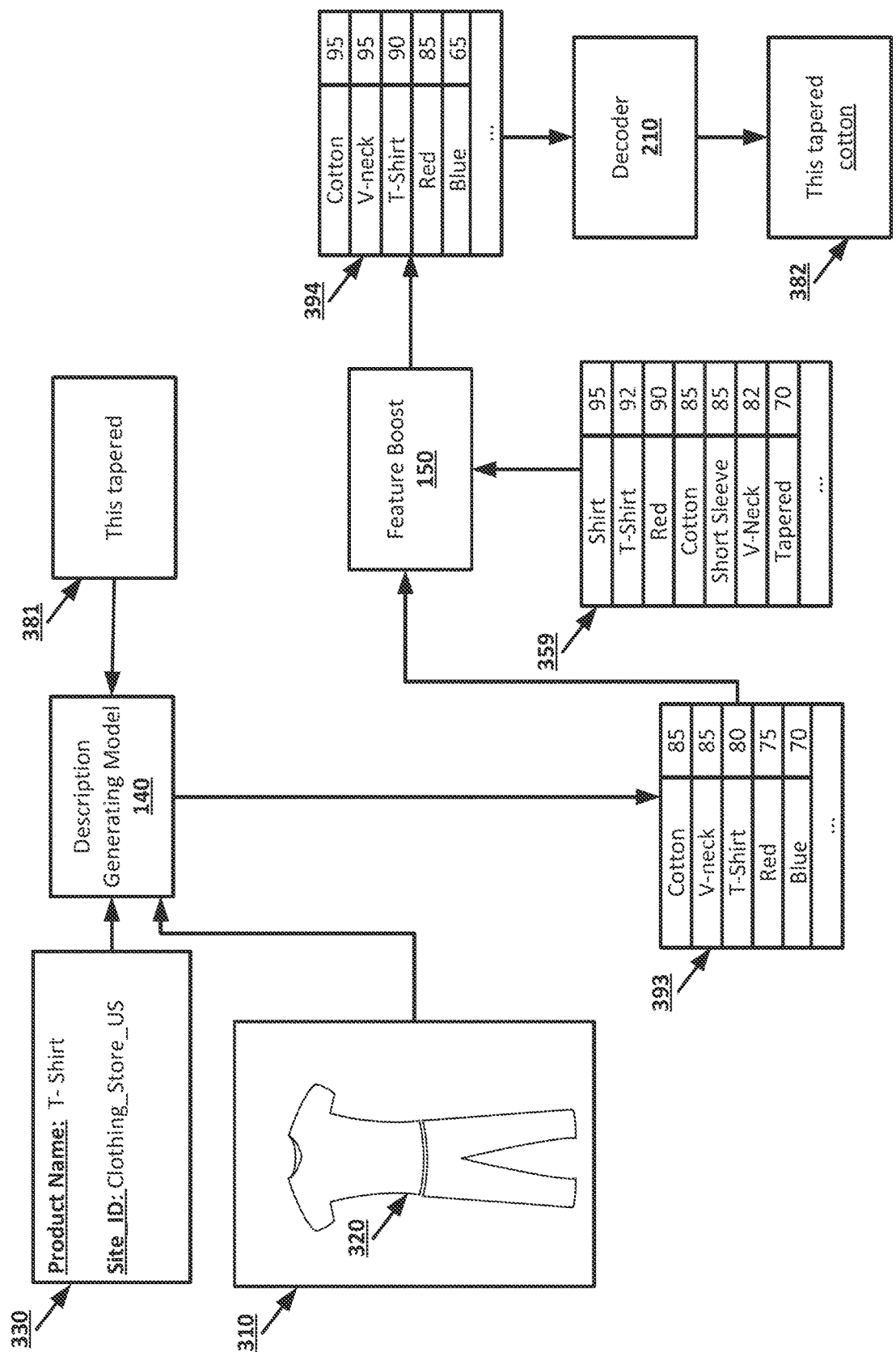
FIG. 3D shows an example arrangement suitable for automatic product description generation according to an implementation of the disclosed subject matter.

FIG. 3D shows an example arrangement for suitable for automatic product description generation according to an implementation of the disclosed subject matter. The text description 381, including the first two words generated by the description generating model 140, may be input to the description generating model 140 along with the image metadata 330 and the image 310. The description generating model 140 may generate candidate words with probabilities 393, which may be candidate words with assigned probabilities that the candidate words should be the next word of the text description of the shirt 320 from the image 310.

The extracted feature set 359 and the candidate words and probabilities 393 may be input to the feature boost 150. The feature boost 150 may use the received extracted feature set 359 to determine which candidate words from the candidate words and probabilities 391 should have their probabilities boosted, for example, based on the similarity between the candidate words and words from the labels of the extracted feature set 359 as determined by the similarity model 160. For example, the feature boost 150 may determine that the candidate word "cotton" is similar to words from labels in the extracted feature set 359, for example, "cotton", and may boost the probability that was assigned to the word "cotton". The feature boost 150 may also decrease the probabilities assigned to candidate words that are dissimilar to words from labels of the extracted feature set 359. The feature boost 150 may output the candidate words and probabilities 394, which may be the candidate words and probabilities 360 with some probabilities changed by the feature boost 150.

The candidate words and probabilities 394 may be input to the decoder 210. The decoder 210 may use the received candidate words and probabilities 394 to select the next word for a text description 382 of the product in the image 310, the shirt 320. The text description 382 may be the text description 381 with the newly selected word added. The decoder 210 may, for example, select the candidate word with the highest probability, which may be "V-neck." The decoder 210 may add the word "cotton" to the text description 381.

This may repeat until an end-of-sequence symbol is given a high enough probability by the description generating model 140 to be selected by the decoder 210 as the next word in the text description, indicating that the description generating model 140 has finished the text description of the product, the shirt 320, in the image 310. Each word selected by the decoder 210 and added to the text description may have been from candidate words and probabilities that were input to the feature boost 150 and compared to the words of the labels of the extracted feature set 359. This may allow probabilities assigned to candidate words by the description generating model 140 to be boosted, or decreased, based on the features from the image 310 extracted by the feature extraction models 110 and 120 as delimited by the ground truth data in the basic feature description 330. Thus, the words of the text description for the shirt 320 may be words that the description generating model 140 and either or both of the feature extraction models 110 and 120 agree describe features of the image 310, and do not conflict with or contradict any ground truths about the shirt 320.

Figure 4:
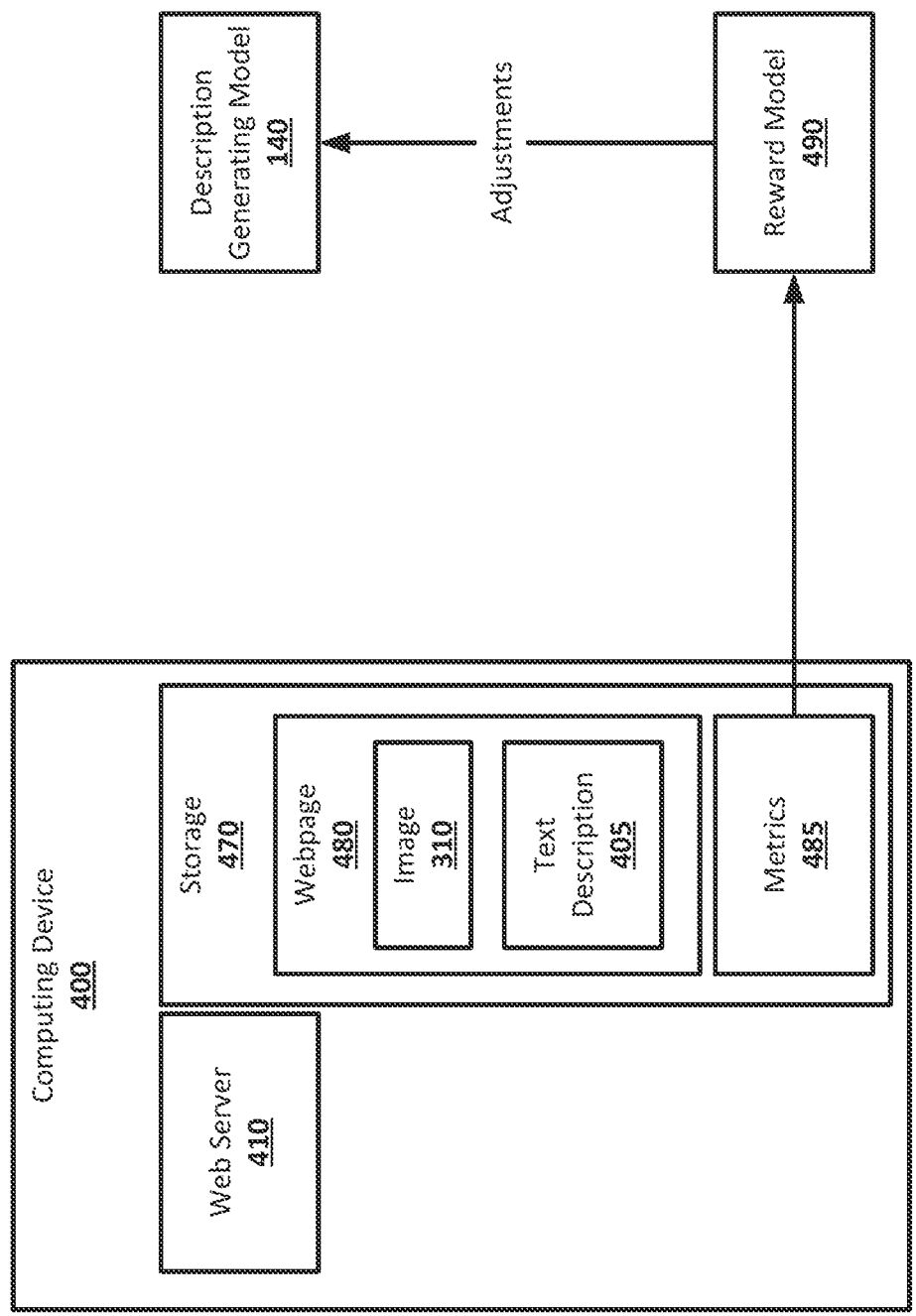
FIG. 4 shows an example arrangement suitable for automatic product description generation according to an implementation of the disclosed subject matter.

FIG. 4 shows an example arrangement for suitable for automatic product description generation according to an implementation of the disclosed subject matter. A computing device 400 may be any suitable computing device, such as, for example, a computer 20 as described in FIG. 7, or component thereof, for implementing automatic product description generation. The computing device 100 may include a web server 410 and a storage 470. The computing device 400 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 400 may be part of a computing system and network infrastructure, or may be otherwise connected to the computing system and network infrastructure, including a larger server network which may include other server systems similar to the computing device 100. The computing device 400 may include any suitable combination of central processing units (CPUs), graphical processing units (GPUs), and tensor processing units (TPUs).

The computing web server 410 may be any suitable combination of hardware and software for serving webpages to other computing devices that requests the webpages from the computing device 400. For example, the computing device 400 may be, or be part of, a server system that may host a website through which a retailer sells products. A webpage 480 may include the image 310 and a text description 405. The image 310 may be the image including the shirt 320, which may be a product sold by the retailer. The text description 405 may be a text description for the shirt 320 generated by the description generating model 140 along with the feature boost 150. The text description may be placed on the webpage 480 with the image 310 and may be displayed to users whose computing devices request the webpage 480, for example, through a web browser or other application that communicates with the web server 410, which may also serve as an application server.

The web server 410 may track user interactions with the webpage 480, generating metrics. The metrics may be stored in metrics 485, any may include any suitable metrics, such as, for example, how many users visit the webpage 480, how many place the shirt 320 in their online shopping carts, and how many purchase the shirt 320.

A reward model 490 may receive the metrics 485 as input. The reward model 490 may be any suitable model, including any suitable heuristic or machine learning model that may have been trained in any suitable manner to evaluate metrics for a webpage for a product, such as the metrics 485 for the webpage 480, to determine if that webpage is effective at selling the product. The reward model 490 may use the metrics 485 to determine if the webpage 480, including the image 310 and the text description 405, is effective at selling the shirt 320. The reward model 490 may determine a quality level of the text description 405 based on how effective the webpage 480 is evaluated to be using the metrics 485. For example, if the metrics 485 indicate that the webpage 480 has been effective at selling the shirt 320, the reward model 490 may determine that the quality level of the text description 405 is high. The text description 405 may be inferred to be effective at getting users who view the webpage 480 to place the shirt 320 in their online shopping carts, and ultimately purchase the shirt 320. For example, the text description 405 may accurately describe the shirt 320 and may be written in a manner that human's find convincing. If the metrics 485 indicate that the webpage 480 has not been effective at selling the shirt 320, the reward model 490 may determine that the quality level of the text description 405 is low. The text description 405 may be inferred to be less effective at getting users who view the webpage 480 to place the shirt 320 in their online shopping carts and ultimately purchase the shirt 320. For example, the text description 405 may include errors, not accurately describing the shirt 320 as depicted in the image 310, or may otherwise not be written in a manner that human users find convincing.

The reward model 490 may adjust the description generation model 140. The adjustments may be performed in any suitable manner and may be based on the quality level determined for the text description 405. For example, the reward model 490 may use a reward function that may reinforce the current states of the description generating model 140 when the text description 405 was determined to have a high quality level, and may perform adjustments when the text description 405 was determined to have a low quality level. In some implementations, a loss model may be used instead of the reward model 490. The loss model may use any suitable loss function to make adjustments to the description generating model 140.

The description generating model 140 may be adjusted by the reward model 490 based on any text descriptions generating by the description generating model 140. For example, the description generating model 140 may be used to generate text descriptions for products from multiple retailers sold on multiple websites. Metrics for any webpage that uses a text description generated by the description generating model 140 may be used as input to the reward model 490 in order to determine adjustments to the description generating model 140.

Figure 5:
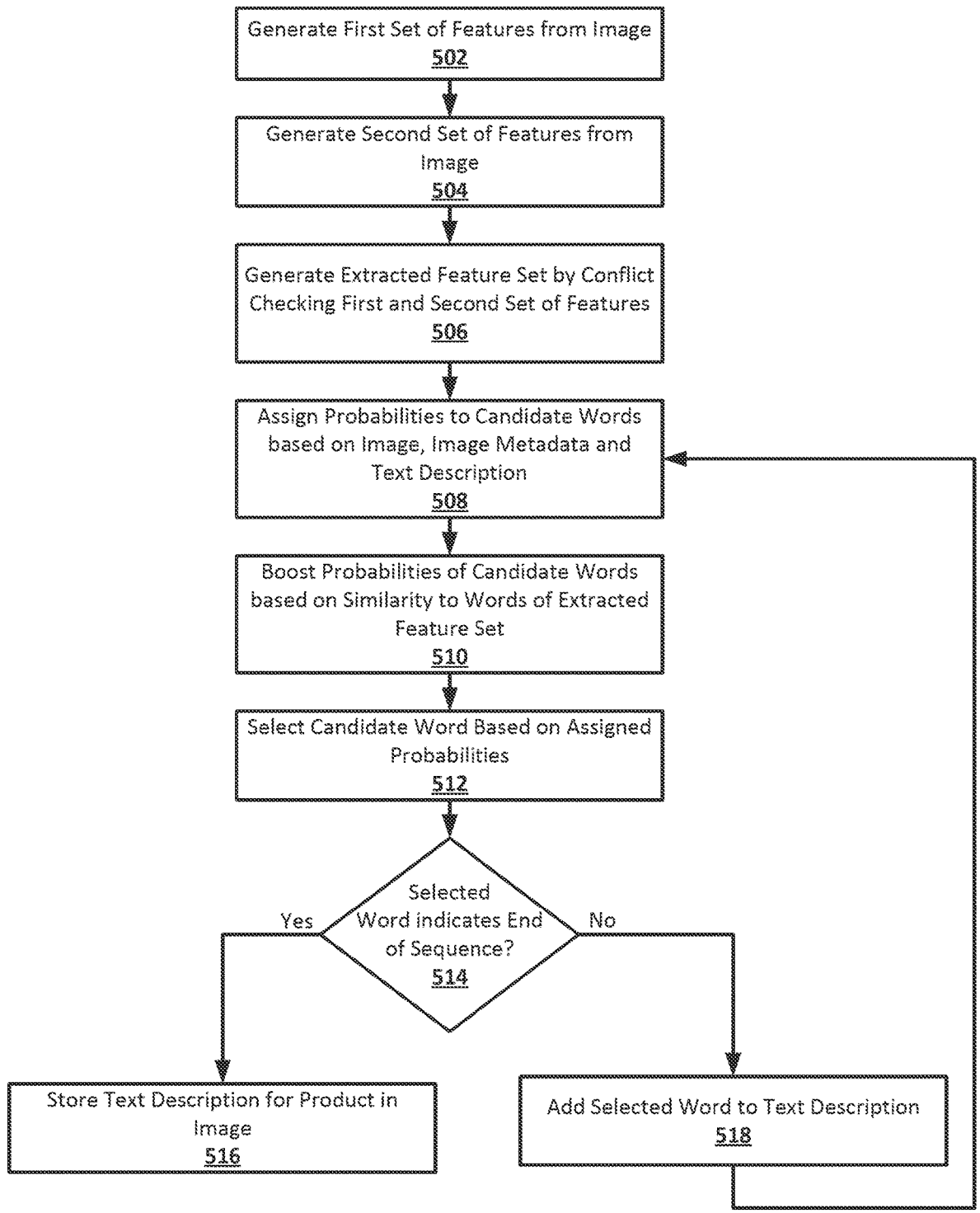
FIG. 5 shows an example procedure suitable for automatic product description generation according to an implementation of the disclosed subject matter.

FIG. 5 shows an example procedure suitable for automatic product description generation according to an implementation of the disclosed subject matter. At 502, a first set of features may be generated from an image. For example, an image from the images 182, such as the image 310, may be received as input by the feature extraction model 110. The feature extraction model 110 may perform feature extraction on the image 310 to generate a first set of features, such as the extracted features 350. The extracted features 350 may include labels for features identified in the image 310 by the feature extraction model 110 and probabilities or confidence levels for the labels indicating, for example, a confidence level of the feature extraction model 110 that a label accurately describes a feature of the image 310. The feature extraction model 110 may have been trained using a public training data set.

At 504, a second set of features may be generated from an image. For example, the image from the images 182, such as the image 310, that was input to the feature extraction model 110 may be received as input by the feature extraction model 120. The feature extraction model 120 may perform feature extraction on the image 310 to generate a second set of features, such as the extracted features 355. The extracted features 355 may include labels for features identified in the image 310 by the feature extraction model 120 and probabilities or confidence levels for the labels indicating, for example, a confidence level of the feature extraction model 210 that a label accurately describes a feature of the image 310. The feature extraction model 120 may have been trained using a non-public training data set different from the public training data set used to train the feature extraction model 110.

At 506, an extracted feature set may be generated by conflict checking the first and second set of features. For example, the extracted features 350 and 355 may be received as input at the conflict check 130. The conflict check 130 may also receive a basic feature description, such as the basic feature description 340, of the product in the image 310, which may be the shirt 320. The conflict check 130 may compare the labels of the extracted features 350 and 355 with data from the basic feature description 340 and determine if any of the labels conflict with or contradict data from the basic feature description 340. Any conflicting or contradictory labels may be removed from the extracted features 350 and 355. Any remaining labels in the extracted features 350 and 355 may be combined into a single extracted feature set, such as the extracted feature set 359.

At 508, probabilities may be assigned to candidate words based on the image, image metadata, and a text description. For example, the description generating model 140 may receive as input the image 310, image metadata 330 for the image 310, and a text description for the image as generated by the description generating model 140. The text description may be the text description currently being generated by the description generating model for the image 310. If no words have been added to the text description, the text description input to the description generating model 140 may be empty. Otherwise, the text description input to the description generating model 140 may include however many words have been selected for the text description thus far by the description generating model 140. The description generating model 140 may assign probabilities to words from a corpus of words based on the input of the image 310, the image metadata 330, and the text description, generating candidate words and probabilities such as the candidate words and probabilities 360. The probability assigned to a word may indicate the probability, or confidence level of the description generating model 140, that the word should be the next word added to the text description describing the product in the image 310.

At 510, probabilities of candidate words may be boosted based on the candidate words similarity to words of the extracted feature set. For example, the feature boost 150 may receive as input the extracted feature set 359 and the candidate words and probabilities 365. The similarity model 160 may determine similarities between words of the labels of the extracted feature set 359 and the candidate words from the candidate words and probabilities 365. Candidate words that are determined by the similarity model 160 to be similar to words from labels of the extracted feature set 359 may have their assigned probabilities boosted by the feature boost 150. The similarity model 160 may also determine if any candidate words are dissimilar to, for example, antonyms to or contradictory to, words from the labels of the extracted feature set 359 and may reduce the assigned probabilities of those words. The results of the feature boost 150 may be, for example, candidate words and probabilities 365, which may be the candidate words and probabilities 360 with the probabilities assigned to candidate words increased, decreased, or unchanged by the feature boost 150.

At 512, a candidate word may be selected based on the assigned probabilities. For example, the decoder 210 may receive the candidate words and probabilities 365 as input, and may select the candidate word that has the highest probability. If more than one candidate word has the highest probability, the decoder 210 may select from among candidate words with the highest probability in any suitable manner.

At 514, if the selected word is an indication of end-of-sequence, flow may proceed to 516. Otherwise, flow may proceed to 518. For example, there may be an end-of-sequence symbol in the corpus of words assigned probabilities by the description generating model 140. If the end-of-sequence symbol has been assigned the highest probability, this may indicate that the text description was completed as of the last word added to the text description, and may be a complete text description, such as the text description 405.

At 516, the text description for the product in the image may be stored. For example, the description generating model 140 may have assigned the highest probability to the end-of-sequence symbol, and the feature boost 150 may not have elevated the probability of any other candidate word over the probability assigned to the end-of-sequence symbol. This may indicate that the text description is complete, for example, as the text description 405. The text description 405 for the product, for example, the shirt 320, in the image 310 may be stored with the text descriptions 188, and may be used for any suitable purpose. For example, the text description 405 may be used on the webpage 480 along with the image 310.

At 518, the selected word may be added to the description. For example, the decoder 210 may have selected the word "cotton" from the candidate words and probabilities 394. The word "cotton" may be added to the text description in its current state, for example, the text description 381, resulting in the text description 382. Flow may proceed back to 508, where the text description 382 may be input to the description generating model 140 along with the image 310 and image metadata 330, as the description generating model 140 may assign probabilities to candidate words to generate a word to be added to the text description 382.

Figure 6:
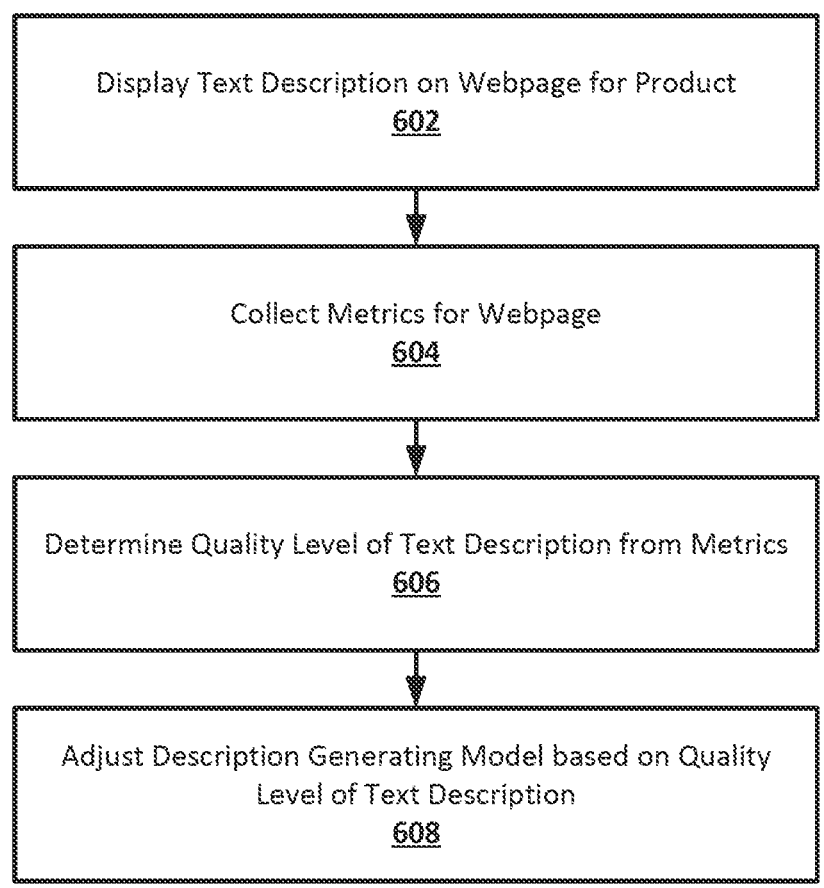
FIG. 6 shows an example procedure suitable for automatic product description generation according to an implementation of the disclosed subject matter.

FIG. 6 shows an example procedure suitable for automatic product description generation according to an implementation of the disclosed subject matter. At 602, a text description may be displayed on a webpage for a product. For example, the text description 405 may be a text description of the shirt 320 generated using the description generating model 140, the feature extraction models 110 and 120, and the feature boost 150. The text description 405 may be added to the webpage 480, which may also include the image 310 showing the shirt 320. The webpage 480 may be part of website for a retailer, and may allow users to purchase the shirt 320.

At 604, metrics for the webpage may be collected. For example, the web server 410 may collect the metrics 485 related to the users interactions with the webpage 480, including, for example, how may users visit the webpage 480, how many users place the shirt 320 in their online shopping cart, and how many users purchase the shirt 320. The metrics 485 may collected in any suitable manner.

At 606, a quality level of the text description may be determined from the metrics. For example, the metrics 485 may received as input at the reward model 490. The reward model 490 may determine a quality level of the text description 405 used on the webpage 480 based on the metrics 485. For example, if the metrics 485 indicate an increase in sales for the shirt 320 over some baseline level of expected sales, or that a high percentage of users who view the webpage 480 purchase the shirt 320, the reward model 490 may determine that the text description 405 has a high quality level, for example, inferring that human users consider the text description 405 to be accurate and convincing. Conversely, if the metrics 485 indicate a decrease in sales of the shirt 320, or that a low percentage of users who view the webpage 480, the reward model 490 may determine that the text description 405 has a low quality, for example, inferring that human users consider the text description 405 to be inaccurate or unconvincing. The reward model 490 may determine quality level of the text description 405 as a binary value, for example either high or low, or on any other suitable scale.

At 608, the description generating model may be adjusted based on the quality level of the text description. For example, the reward model 490 may adjust the description generating model 140 in any suitable manner, using any suitable reward or loss function. When using a reward function, if the text description 405 was determined to have a high quality level, this may indicate that the description generating model 140 should be rewarded, while if the description generating model 140 was determined to have a low level, no reward is given to the description generating model 140. The reward model 490 may use any suitable reinforcement learning mechanism when adjusting the description generating model 140 based on the quality level determined for a text description. This may allow the description generating model 140 to be fine-tuned to generate more high quality text descriptions for products.

Figure 7:
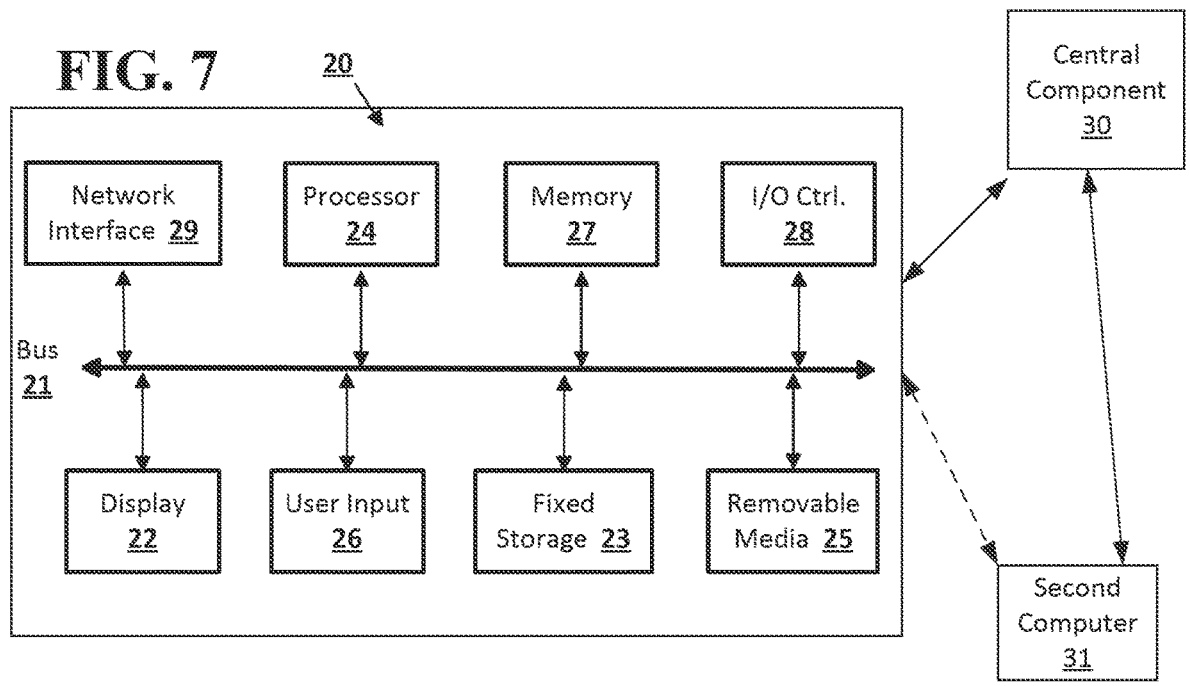
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
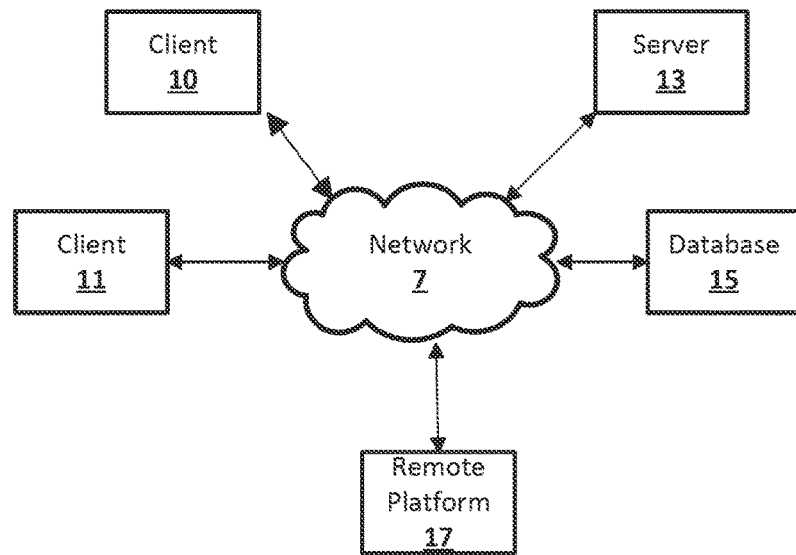
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   generating, by a computing device, from an image, using a first feature extraction model, a first set of features comprising labels comprising words;
   generating, by a computing device, from the image, using a second feature extraction model, a second set of features comprising labels comprising words;
   generating, by a computing device, a text description of a product depicted in the image by inputting the image and metadata for the image to a description generating model, wherein the text description comprises words and each of the words is generated by:
      assigning, by a computing device, probabilities to candidate words,
      boosting, by a computing device, the assigned probabilities of candidate words that are similar to words of labels of the first set of features or words of labels of the second set of features, and
      selecting, by a computing device, one of the candidate words based on the assigned probabilities after the boosting as a word of the text description;
   determining by the computing device a quality level of the text description based on metrics for user interactions with a webpage for the product depicted in the image wherein the webpage comprises the text description of the product depicted in the image generated by inputting the image and metadata for the image to the description generating model; and
   adjusting by the computing device the description generating model based on the determined quality level of the text description.

2. The computer-implemented method of claim 1, wherein boosting the assigned probabilities of candidate words that are similar to words of labels the first set of features or words of labels of the second set of features further comprises determining levels of similarity between the candidate words and the words of the labels of the first set of features and the words of the labels the second set of features using a similarity model.

3. The computer-implemented method of claim 1, further comprising
   generating an extracted feature set from the first set of features and the second set of features by:
      conflict checking the words of the labels of the first set of features and the words of the labels of the second set of features against data in a basic feature description of the product depicted in the image,
      removing from the first set of features and the second set of features any labels comprising words that conflict with data in the basic feature description, and
      combining labels not removed from the first set of features and the second set of features into an extracted feature set.

4. The computer-implemented method of claim 3, wherein boosting the assigned probabilities of candidate words that are similar to words of labels of the first set of features or words of labels of the second set of features comprises the boosting the assigned probabilities of candidate words that are similar to words of labels of the extracted feature set.

5. The computer-implemented method of claim 1, wherein generating a text description of a product depicted in the image by inputting the image and metadata for the image to a description generating model, wherein the text description comprises words and each of the words is generated, further comprises, after selecting a first word for the text description, inputting the text description with all selected words to the description generating model before assigning probabilities to candidate words.

6. The computer-implemented method of claim 1, wherein generating a text description of a product depicted in the image by inputting the image and metadata for the image to a description generating model, wherein the text description comprises words and each of the words is generated, further comprises decreasing the assigned probabilities of candidate words that are dissimilar to words of labels of the first set of features or words of labels of the second set of features.

7. The computer-implemented method of claim 1, wherein selecting one of the candidate words based on the assigned probabilities after the boosting as a word of the text description comprises selecting a candidate word with the highest assigned probability.

8. The computer-implemented method of claim 1, wherein the labels of the first set of features and the labels of the second set of features have assigned probabilities, and further comprising using a top-K restriction on the labels of the first set of features and the labels of the second set of features based on the assigned probabilities when boosting the assigned probabilities of candidate words that are similar to words of labels of the first set of features or words of labels of the second set of features.

9. A computer-implemented system for localization of matrix factorization models trained with global data comprising:
one or more storage devices; and
a processor that generates from an image, using a first feature extraction model, a first set of features comprising labels comprising words,
generates from the image, using a second feature extraction model, a second set of features comprising labels comprising words,
generates a text description of a product depicted in the image by inputting the image and metadata for the image to a description generating model, wherein the text description comprises words and each of the words is generated by:
assigning probabilities to candidate words,
boosting the assigned probabilities of candidate words that are similar to words of labels of the first set of features or words of labels of the second set of features, and
selecting one of the candidate words based on the assigned probabilities after the boosting as a word of the text description, and
determines a quality level of the text description based on metrics for user interactions with a webpage for the product depicted in the image wherein the webpage comprises the text description of the product depicted in the image generated by inputting the image and metadata for the image to the description generating model, and
adjusts the description generating model based on the determined quality level of the text description.

10. The computer-implemented system of claim 9, wherein the processor boosts the assigned probabilities of candidate words that are similar to words of labels the first set of features or words of labels of the second set of features further by determining levels of similarity between the candidate words and the words of the labels of the first set of features and the words of the labels the second set of features using a similarity model.

11. The computer-implemented system of claim 9, wherein the processor further generates an extracted feature set from the first set of features and the second set of features by:

conflict checking the words of the labels of the first set of features and the words of the labels of the second set of features against data in a basic feature description of the product depicted in the image,
removing from the first set of features and the second set of features any labels comprising words that conflict with data in the basic feature description, and
combining labels not removed from the first set of features and the second set of features into an extracted feature set.

12. The computer-implemented system of claim 11, wherein the processor boosts the assigned probabilities of candidate words that are similar to words of labels of the first set of features or words of labels of the second set of features by boosting the assigned probabilities of candidate words that are similar to words of labels of the extracted feature set.

13. The computer-implemented system of claim 9, wherein the processor further generates a text description of a product depicted in the image by inputting the image and metadata for the image to a description generating model, wherein the text description comprises words and each of the words is generated further by, after selecting a first word for the text description, inputting the text description with all previously selected words for the text description to the description generating model before assigning probabilities to candidate words.

14. The computer-implemented system of claim 9, wherein the processor generates a text description of a product depicted in the image by inputting the image and metadata for the image to a description generating model, wherein the text description comprises words and each of the words is generated, further by decreasing the assigned probabilities of candidate words that are dissimilar to words of labels of the first set of features or words of labels of the second set of features.

15. The computer-implemented system of claim 9, wherein the processor selects one of the candidate words based on the assigned probabilities after the boosting as a word of the text description by selecting a candidate word with the highest assigned probability.

16. The computer-implemented system of claim 9, wherein the labels of the first set of features and the labels of the second set of features have assigned probabilities, and wherein the processor further uses a top-K restriction on the labels of the first set of features and the labels of the second set of features based on the assigned probabilities when boosting the assigned probabilities of candidate words that are similar to words of labels of the first set of features or words of labels of the second set of features.

17. A system comprising: one or more computers and one or more storage devices storing instructions which are operable, when executed by the one or more computers, to cause the one or more computers to perform operations comprising:
generating from an image, using a first feature extraction model, a first set of features comprising labels comprising words;
generating from the image, using a second feature extraction model, a second set of features comprising labels comprising words;
generating a text description of a product depicted in the image by inputting the image and metadata for the image to a description generating model, wherein the text description comprises words and each of the words is generated by:
assigning probabilities to candidate words, boosting the assigned probabilities of candidate words that are similar to words of labels of the first set of features or words of labels of the second set of features, and selecting one of the candidate words based on the assigned probabilities after the boosting as a word of the text description;

determining a quality level of the text description based on metrics for user interactions with a webpage for the product depicted in the image wherein the webpage comprises the text description of the product depicted in the image generated by inputting the image and metadata for the image to the description generating model; and adjusting the description generating model based on the determined quality level of the text description.

* * * * *